United States Patent
Ishida et al.

[11] Patent Number: 5,389,866
[45] Date of Patent: Feb. 14, 1995

[54] CONTROLLER FOR A STEP MOTOR

[75] Inventors: Katsumi Ishida, Obu; Hiroshi Miyata; Naoto Kushi, both of Toyota, all of Japan

[73] Assignees: Aisan Kogyo Kabushiki Kaisha; Toyoto Jidosha Kabushiki Kaisha, both of Aichi, Japan

[21] Appl. No.: 47,277

[22] Filed: Apr. 19, 1993

[30] Foreign Application Priority Data

Apr. 24, 1992 [JP] Japan ................... 4-131502

[51] Int. Cl.$^6$ .................................. G05B 11/06
[52] U.S. Cl. ........................... 318/600; 318/696
[58] Field of Search ............... 318/685, 696, 561, 565, 318/600, 601

[56] References Cited

U.S. PATENT DOCUMENTS

| | | | |
|---|---|---|---|
| 4,523,138 | 6/1985 | Sakaurai | 318/696 |
| 4,636,959 | 1/1987 | Salazar et al. | 364/464 |
| 4,636,969 | 1/1987 | Salazar et al. | 388/811 X |
| 4,685,434 | 8/1987 | Ando et al. | 318/685 X |

FOREIGN PATENT DOCUMENTS 61-138855 6/1986 Japan.
1-185195 7/1989 Japan.

*Primary Examiner*—William M. Shoop, Jr.
*Assistant Examiner*—Brian Sircus
*Attorney, Agent, or Firm*—Oliff & Berridge

[57] ABSTRACT

A controller for a step motor which permits the actual step number of the step motor to properly follow up the target step number may be varied with time. The controller temporarily determines a duration shorter than an actually derived duration, and checks the target step number again when the temporarily determined duration has elapsed. If the target step number has not changed, the actually derived duration is considered as a finally determined duration, while, if the target step number has changed, the duration of energization is re-derived from the changed target step number.

12 Claims, 6 Drawing Sheets

| SPEED LEVEL | 0 | 1 | 2 | 3 | 4 | 5 |
|---|---|---|---|---|---|---|
| DURATION OF ENERGIZATION (PULSE WIDTH) | 1/67 | 1/400 | 1/600 | 1/800 | 1/1000 | 1/1200 |

CONTROLLER FOR A STEP MOTOR

BACKGROUND OF THE INVENTION

1. Field of the Invention

The present invention relates to a controller for controlling a step number of a step motor or a rotational position of a rotor of the step motor, and more specifically to such a controller for a step motor which can satisfactorily follow up a target step number which may be varied with time. For example, when a step motor is employed to actuate a throttle valve in accordance with a depressed amount of an accelerator pedal of a vehicle, the target step number of the step motor will be varied with time, due to change in the depressed amount of the accelerator pedal.

2. Description of the Prior Art

An example of the prior art for controlling a step motor so as to have an actual step number conforming with a target step number which may be varied with time is described in Japanese Laid-Open Patent Publication No. 61-138855. In this prior art, a step number deviation is derived from the target step number and an actual step number so as to adjust the duration of driving pulses in accordance therewith. Specifically, as the deviation is greater, the step motor is driven at a higher speed by reducing the pulse duration, while as the deviation becomes smaller, the pulse duration is increased to drive the step motor at a lower speed, until the deviation reaches zero, when the step motor is stopped. Then the actual step number will conform with the target step number. When this process is repeated each time the target step number varies, the actual step motor will follow up the target step number which varies with time.

Once the speed of the step motor becomes zero, a rotor of the step motor causes vibration. If the step motor is inadvertently restarted thereafter, the vibration will be amplified, which may result in step out. The term "step out" is used herein to refer to a condition in which the rotational position of a rotor does not correspond to the position of coils to which current is applied. Therefore, there has been proposed a technique that, when the actual step number of the step motor has reached the target step number, the pulse for maintaining the actual step number at the target step number is kept on, until the vibration of the rotor is sufficiently damped. In other words, output of a pulse for advancing the step motor to a next step number for restart thereof is inhibited for a certain duration. For example, in Japanese Laid-Open Patent Publication No. 1-185195, restart is inhibited for a duration of 100 ms, a hundred times longer than the pulse duration (pulse width) corresponding to the highest speed of the step motor.

The above prior art is sufficient in the case where the target step number is gradually varied with time. The prior art will be, however, accompanied with following problems, in the case where the target step number is rapidly varied with time.

FIG. 3 is a diagram illustrating the relation between time and the step number, with time shown by the axis of abscissa and the step number by the axis of ordinate, and the target step number is shown by a stepped linear graph TS. When it is assumed that energization of the step motor to advance to a next step number is started at a timing T0, a step deviation DS (T0) between a target step number at the timing T0 and an actual step number at the timing T0 is derived to determine a duration $\Delta T0$ of a pulse for advancing the step motor to the next step number. When the duration $\Delta T0$ has elapsed since the timing T0, or at a timing T1, a step deviation DS(T1) is again derived to determine a pulse width $\Delta T1$ in accordance therewith. As the step deviation is greater, a shorter pulse width is determined to drive the motor at a higher speed, while as the deviation becomes smaller, a longer pulse width is determined to drive the motor at a lower speed. At a timing T2 when one more pulse permits the actual step number of the motor to conform with the target step number, the pulse for maintaining the motor at the next step (the target step number) is kept on for a duration ($\Delta T2$ in FIG. 3) long enough to sufficiently damp vibration of a rotor of the motor.

In the case of a motor whose target step number is rapidly varied with time, the target step number may have changed before a timing T3 in FIG. 3 when restart of the motor is permitted. In such a case, a step deviation DS (T3) is derived at the timing T3 when restart is permitted to determine the pulse width $\Delta T3$ again. Therefore, the step deviation DS(T3) has rather increased, and the step motor is required to repeat such an operation as to abruptly remove the increased deviation, as shown by dotted lines in FIG. 3. The alphabetic symbol SP in FIG. 3 illustrates the change of the step number when the step motor which has been at rest is accelerated to the highest speed.

The above description relates to the case in which, in the duration of the pulse started at the timing T2 for conforming the actual step number with the target step number and for damping the vibration of the rotar at the target step number, the target step number has been varied. The same problem will occur in case the actual step number has not reached the target step number. It is assumed in FIG. 4 that a duration of energization $\Delta T4$ is determined in accordance with a deviation DS(T4) at a timing T4. It is also assumed that thereafter the target step number has been varied in the duration of energization $\Delta T4$. In such a case, the actual step number is controlled as shown by dotted lines in FIG. 4. The step deviation at the timing T4 should be however, the deviation in relation to the varied target step number DS(T4)A to determine the pulse width $\Delta T4A$ in accordance therewith. This will permit the actual step number to better follow up of variation in the target step number, as shown in solid lines in FIG. 4.

As described above, the prior art determines the pulse width or duration of energization in accordance with the step deviation at start of energization of each pulse, and is consequently ineffective to follow up variation in the target step number thereafter. It has been desired to develop a technique which permits better follow up of any variation in the target step number which may occur after start of pulse energization.

SUMMARY OF THE INVENTION

The present invention includes a controller for a step motor that permits the actual step number of the step motor to properly follow up the target step number, which may be varied with time. The controller temporarily determines a duration shorter than an actually derived duration, and checks the target step number again when the temporarily determined duration has elapsed. If the target step number has not changed, the actually derived duration is considered a finally determined duration, while, if the target step number has changed, the duration of energization is re-derived from the changed target step number.

The present invention will be more fully understood from the following detailed description and appended claims when taken with the accompanied drawings.

DETAILED DESCRIPTION OF THE PREFERRED EMBODIMENTS

Figure 1:
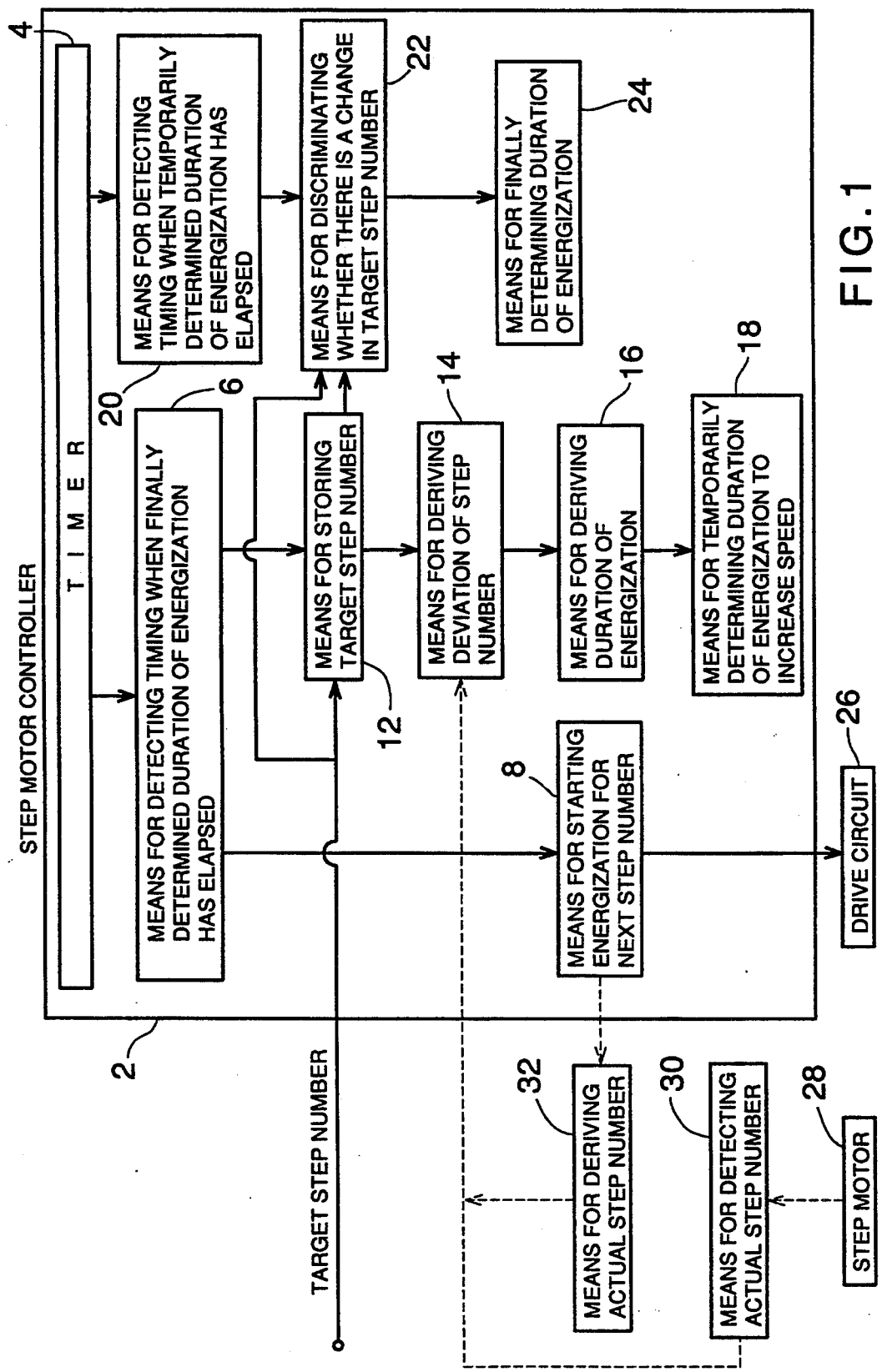
FIG. 1 is a block diagram illustrating the concept of the first aspect of the invention.

The present invention has developed a device whose concept is diagrammatically illustrated in FIG. 1. The device is a controller 2 for controlling a step motor 28 so as to conform with a target step number which may be varied with time. The controller 2 includes the following. A timer 4 for measuring time and means 6 utilizes the time measured by the timer 4 to detect a timing when a finally determined duration of energization has elapsed. A means 8 permits a drive circuit 26 of the step motor 28 to start energization for advancing the step motor to a next step number. A means 12 stores a target step number when the timing detecting means 6 detects the timing. A means 14 derives a step deviation between the target step number when the timing detecting means 6 detects the, timing and an actual step number of the step motor 28. A means 16 derives a duration of energization in accordance with the step deviation derived by the means 14. A means 18 temporarily determines a duration of energization corrected so as to increase speed in comparison with the duration of energization derived by the deriving means 16. A means 20 utilizes the time measured by the timer 4 to detect a timing when the duration of energization temporarily determined by the means 18 has elapsed. A means 22 discriminates whether there is a change in the target step number or not from the target step number stored in the storing means 12 and a current target step number. A means 24 finally determines a duration of energization which is equal to the duration of energization derived in accordance with the step deviation between the current target step number and the actual step number at the timing detected just before by the means 6 in the case where the means 22 determines that the target step number has changed, and for finally determining the duration of energization is equal to the duration of energization derived by the means 16 at the timing detected just before by the means 6 in the case where the means 22 determines that the target step number has not changed.

Figure 4:
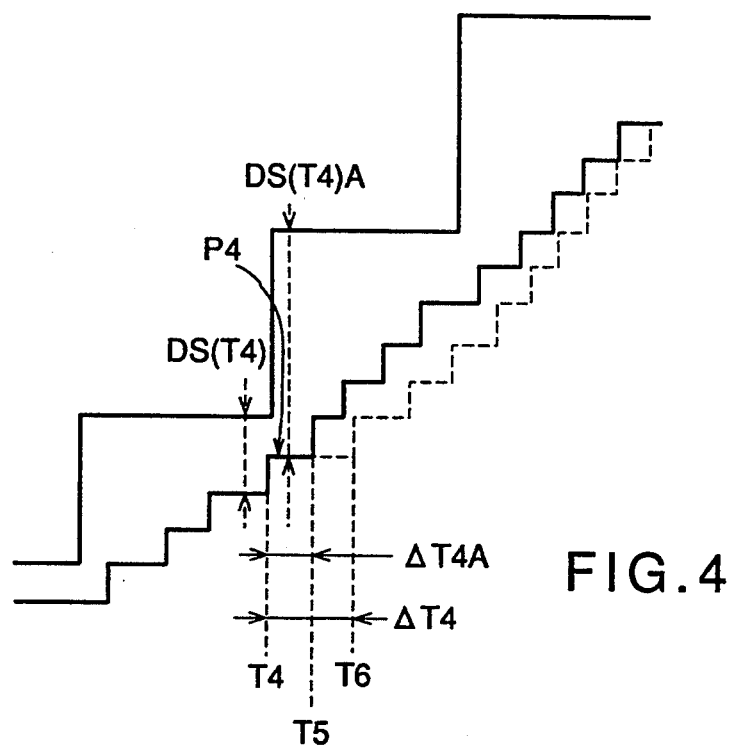
FIG. 4 is a view illustrating the operation of the device shown in FIG. 2.

According to the device shown in FIG. 1, the means 6 which detects the timing when the finally determine duration of energization has elapsed detects a termination timing of a pulse, for example, a timing T4 in FIG. 4. At this timing, the means 8 starts to output a pulse, for example, a pulse P4 in FIG. 4, for advancing the step motor 28 to a next step number. The duration of the pulse ($\Delta T4$ in FIG. 4) is derived by the means 12, 14, 16. The technique described above is known to the art.

The present invention is further provided with the means 18 for temporarily determining a duration of energization which is equal to the duration of energization corrected to increase speed in comparison with the duration of energization derived by the means 16 or determining $\Delta T4A$ shorter than $\Delta T4$ in FIG. 4. The present invention is further provided with the means 20 for detecting a timing when the temporarily determined duration of energization has elapsed, or a timing T5 in FIG. 4. The means 22 discriminates whether there is any change in the target step number, when the timing T5 is detected. If the target step number has not changed, the duration ($\Delta T4$ in FIG. 4) derived by the means 16 is used as the duration of energization. As a result, the pulse is continued to be outputted until a timing T6. As this operation is executed at the timing T5 earlier than the timing T6, the above operation is possible.

If the target step number has changed, a duration of energization is again derived in accordance with a step deviation between a new target step number and the actual step number at the timing T4 when output of the pulse P4 is started. In FIG. 4, the duration of energization is again derived in accordance with new step deviation DS(T4)A between the target step number at the timing T5 and the actual step number at the timing T4. The duration of energization thus derived is equal to the duration of energization so controlled as to conform with the new target step number. As the result, the actual step number can properly follow up the variation in the target step number, as shown in the solid lines in FIG. 4.

Figure 2:
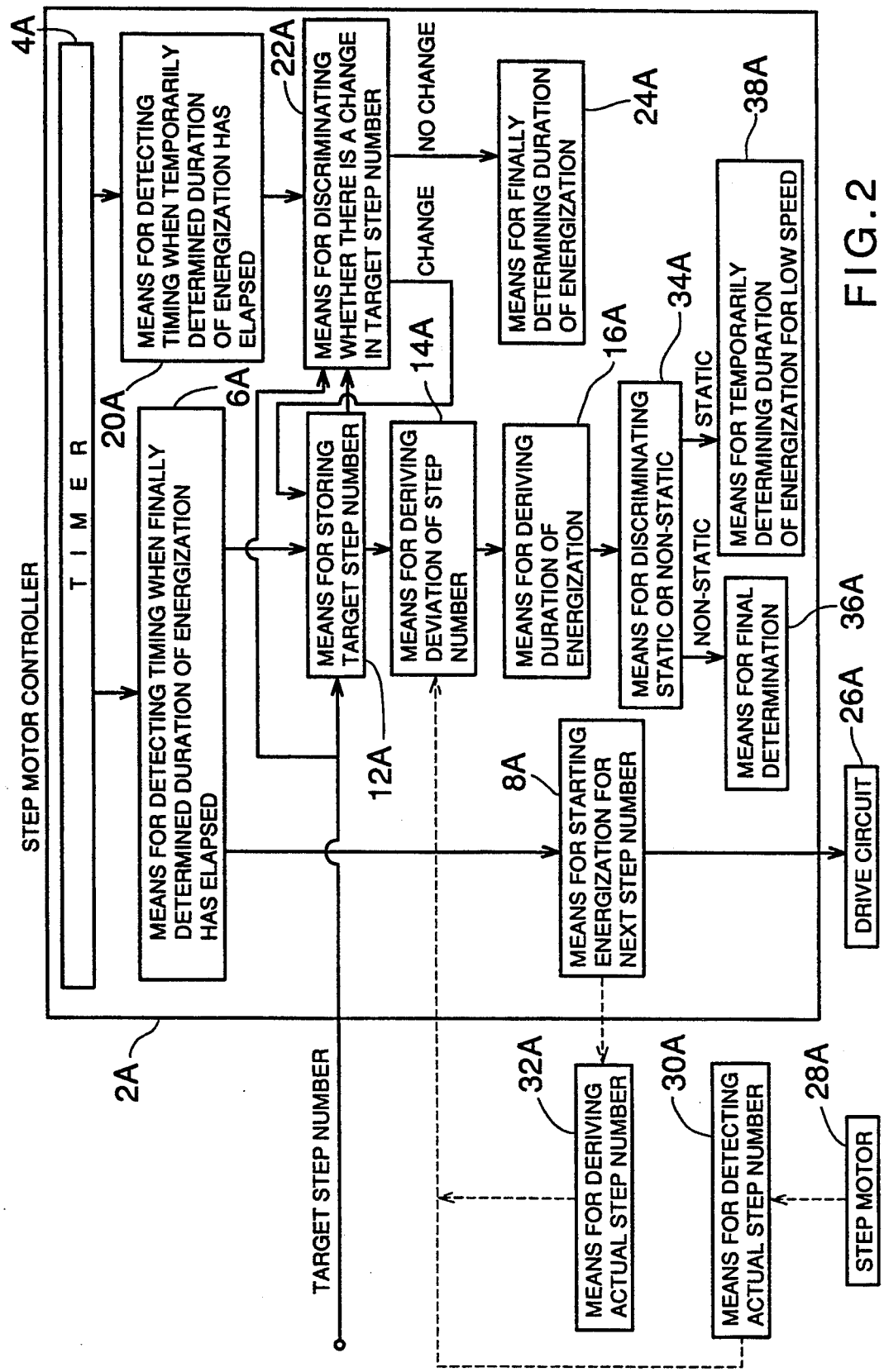
FIG. 2 is a block diagram illustrating the concept of the second aspect of the invention.

Another aspect of the present invention provides a device whose concept is diagrammatically illustrated in FIG. 2. The device is a controller 2A for controlling a step motor 28A so as to conform with a target step number which may be varied with time. The controller 2A comprises a timer 4A for measuring time, means 6A utilizing the time measured by the timer 4A to detect a timing when a finally determined duration of energization has elapsed, means 8A for permitting a drive circuit 26A of the step motor 28A to start energization for advancing the step motor to a next step number, means 12A for storing a target step number when the timing detecting means 6A detects the timing, means 14A for deriving a step deviation between the target step number when the timing detecting means 6A detects the timing and an actual step number of the step motor 28A, means 16A for deriving a duration of energization in accordance with the step deviation derived by the means 14A, means 34A for discriminating whether the duration of energization derived by the means 16A corresponds to the static or non-static operation, means 36A for finally determining a duration of energization which is equal to the duration of energization derived by the means 16A in the case where the means 34A discriminates as the non-static operation, means 38A for temporarily determining a duration of energization corresponding to a reduced speed in the case where the means 34A discriminates as the static operation, means 20A utilizing the time measured by the timer 4A to detect a timing when the duration of energization temporarily determined by the means 38A has elapsed, means 22A for discriminating whether there is a change in the target step number or not from the target step number stored in the storing means 12A and a current target step number, and means 24A for finally determining a duration of energization which is equal to the duration of energization determined by the means 38A in the case the means 22A determines that the target step number has changed, and for finally determining a duration of energization which is equal to the duration of energization derived by the means 16A at the timing detected just before by the means 6A in the case where the means 22A determines that the target step number has not changed.

According to the device shown in FIG. 2, the means 34A is used to discriminate whether the pulse is for the static operation or the non-static operation. For example, pulses P0, P1 in FIG. 3 correspond to the non-static operation, in which the process similar to that of the prior art is carried out. In the case of energization for the static operation as shown by P2 in FIG. 3, a duration of energization for driving the step motor at a lower speed is temporarily determined by the means 38A. The means 20A is operable to detect a timing when the temporarily determined duration of energization has elapsed, or a timing T3A in FIG. 3. At this time, it is discriminated whether there is any change in the target step number or not, and if the target step number has not changed, the pulse is kept on for the duration ΔT2 previously derived by the means 16A, and the motor is completely brought to rest. If the target step number has changed in the duration, the duration determined by the means 38A is finally determined as a duration of the pulse P2. Therefore, the duration of energization of the pulse P2 can be determined in accordance with the new target step number. Thus, the present invention is effective to properly follow up the variation in the target step number.

Figures 5, 6:
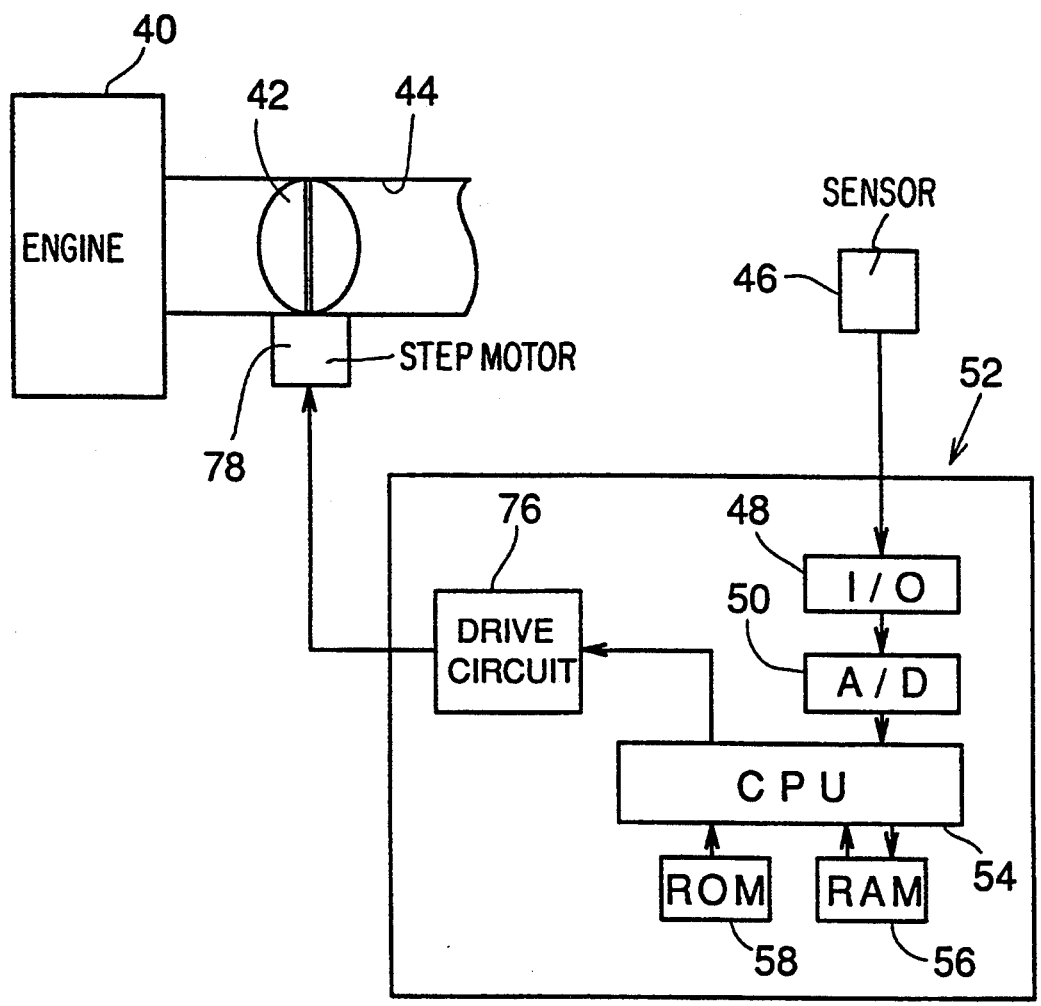
FIG. 5 is a view illustrating a system construction in accordance with an embodiment of the present invention.
FIG. 6 is a view illustrating the relation between the speed level and the duration of energization.

FIG. 5 illustrates an embodiment of the present invention incorporated in a system for adjusting the intake air amount into an engine 40 by opening and closing a throttle valve 42 provided within an intake pipe 44 for opening and closing movement by a step motor 78. The system includes a sensor 46 for detecting the depressed amount of an accelerator pedal, and a controller 52 for determining a target step number and adjusting the actual step number of the step motor 78 so as to conform with the determined target step number. In the controller 52, the detected value of the sensor 46 can be inputted to a CPU 54 through an interface 48 and an analog/digital converter 50. The CPU 54 is operated in accordance with an actual step number determining program stored in a ROM 58 and receives the detected value by the sensor 46 to derive a target step number for the step motor 78 which can provide optimum intake air amount at the time. The process for determining the target step number in accordance with the accelerator pedal depressed amount is not a subject of the invention but known to the art and any further description will be omitted.

Figure 7:
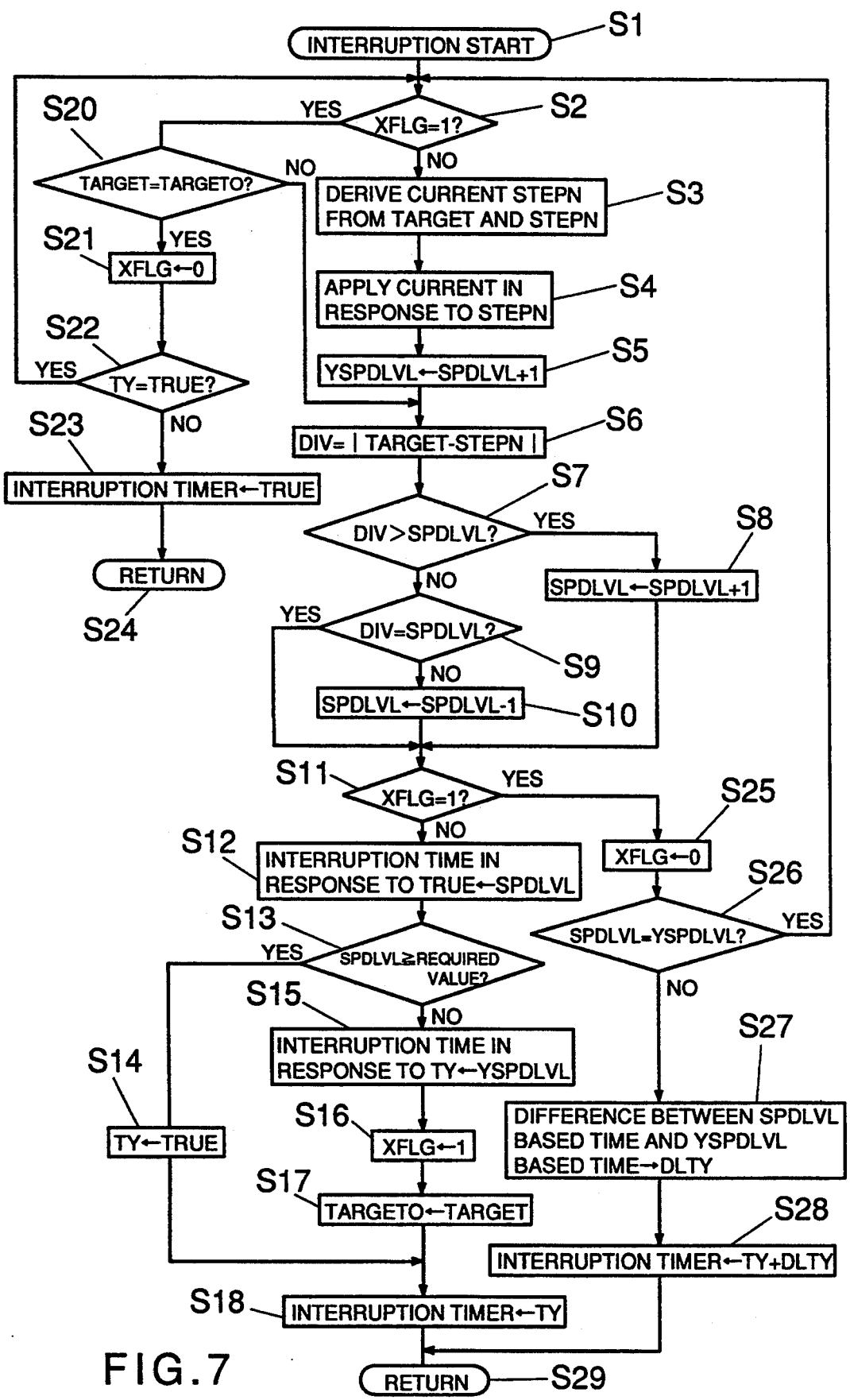
FIG. 7 is a flow chart of the procedure for the embodiment according to the first aspect of the invention.

The CPU 54 further controls the step motor 78 in accordance with a step motor controlling program stored in the ROM 58. The flow chart of the program is shown in FIG. 7. The program in FIG. 7 is so designed as to be interruptively executed when the interruption time set in Step 18 or 28 which will be mentioned later is measured. In Step S1, an interruption handing routine is initiated, and the CPU 54 discriminates whether a flag XFLG is zero or 1 (Step S2). The flag XFLG is provided to discriminate whether the timing is a temporarily determined one (in this case 1) or a finally determined one (in this case zero). Initially, the flag XFLG is set to zero. Thus, the CPU 54 discriminate as no in Step S2 at the timing when the finally determined duration of energization has elapsed, while the CPU 54 discriminates as yes at the timing when the temporarily determined duration of energization has elapsed. In other words, the means 6 for detecting the timing when the finally determined duration of energization has elapsed and the means 20 for detecting the timing when the temporarily determined duration of energization has elapsed in accordance with the present invention (See FIG. 1) are composed of Steps S1 and S2, the CPU 54 for executing them and the program stored in the ROM 58 and instructing the CPU 54 to execute Steps S1 and S2.

Although the other means as shown in FIGS. 1 and 2 are also composed of the CPU 54 and programs stored in the ROM 58, the following description will be related with reference to corresponding step numbers.

Figure 3:
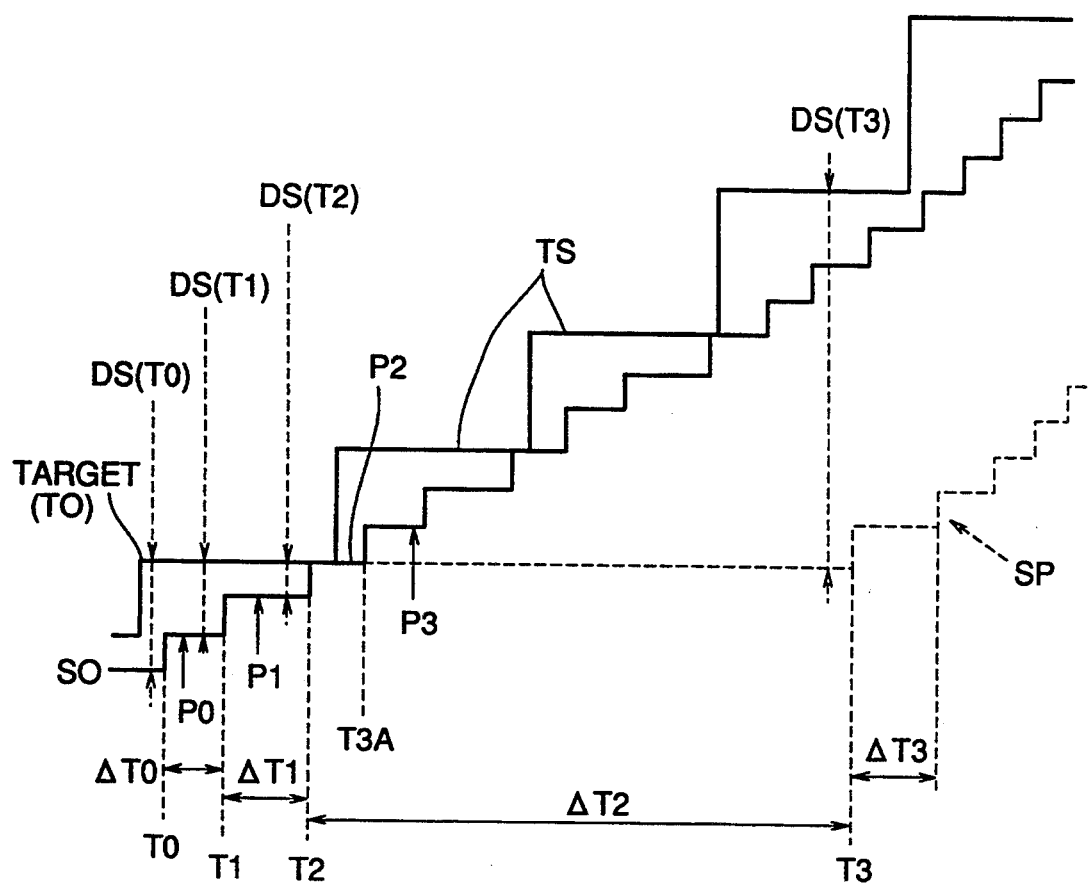
FIG. 3 is a view illustrating the operation of the device shown in FIG. 1.

The CPU 54 discriminates as no in Step S2 at the timing when the finally determined duration of energization has elapsed (T0, T1, T2 in FIG. 3 and T4 in FIG. 4). Then, a current STEPN is derived from a target step number TARGET at the time and an actual step number STEPN in Step S3. For example, at the timing T0 in FIG. 3, as the target step number TARGET(T0) is greater than the actual step number S0, the program determines at the timing T0 to advance the step motor to a STEPN greater than the current actual step number S0 by one. If the target step number TARGET is smaller than the actual step number STEPN, a STEPN decremented by one is selected. In Step S4, energization of a coil selected from a plurality of coils in the step motor in accordance with the derived step number STEPN in Step S3 is started. The step S4 corresponds to the means 8 for starting energization to advance the step motor 28 to a next step number. The actual step number may be obtained by the means 32 for deriving the actual step number as shown in FIGS. 1 and 2, or it may be detected by a sensor such as the means 30 for directly detecting the actual step number. In this embodiment, the means 32 is composed of Step S3.

After execution of Step S4, the current speed level SPDLVL is corrected by one to increase speed and then stored as YSPDLVL for a sequential output. FIG. 6 shows the relationship between the speed level and the duration of energization, and as the speed level is higher, the pulse duration (which may be referred to as pulse width or duration of energization) becomes shorter to rotate the motor at a higher speed. At a speed level 0, as application of energization for restart the step motor is inhibited for a certain period, the duration of energization is longer by a column than the other speed levels, so that next energization may be inhibited, until vibration of the motor is sufficiently damped. Otherwise, step out would disadvantageously occur at restart of the step motor.

When Step S5 is executed at the timing T2 in FIG. 3, a duration of energization shorter than the duration of P1 by one level is prepared. This duration of energization terminates at a timing T3A in FIG. 3. This procedure results in that the duration of energization thus prepared is shorter than the duration of P2 by two speed levels.

In Step S6, the absolute value of a step deviation DIV between the current target step number TARGET and the actual step number STEPN derived in Step S3 is calculated. Then, the absolute step deviation DIV is used to correct the speed level (Steps S7 to S10). If the absolute deviation DIV is greater than the speed level SPDLVL at the time, the CPU 54 discriminates as yes in Step S7, and the speed level is corrected by one level so as to increase speed in Step S8. Though not shown in the drawings, the program is so designed that the highest speed level is five. On the contrary, if the absolute deviation DIV is smaller than the speed level SPDLVL, the CPU 54 discriminates as no in Step S9, and the speed level is corrected by one level so as to reduce speed. If the absolute deviation DIV is equal to the speed level SPDLVL, the speed level is maintained (Steps S8 and S10 are skipped). As the result, the speed level is adjusted in such a manner that, the duration of energization becomes gradually longer toward the target step number, as shown by the timings T0, T1 and T2 in FIG. 3, and when the actual step number conforms with the target step number (DIV=0), the speed level becomes zero. Though, in this embodiment, the speed level or the duration of energization is derived in accordance with the actual step number updated in Step S3, it may be derived in accordance with the actual step number before updated.

As described above, the means 14 for deriving the step deviation is composed of Step S6, and the means 16 for deriving the duration of energization is composed of Steps S7 to S10. Each speed level corresponds to a duration of energization, so that, if a speed level is determined, a corresponding duration of energization is also determined.

After the above processes, the CPU 54 discriminates whether the flag XFLG is one or not in Step S11. In case of the timing when the finally determined duration of energization has elapsed, the CPU 54 discriminates as no, and Step S12 is executed. In Step S12, the duration of energization corresponding to the speed level determined in Steps S7 to S10 (strictly the time obtained by adding the duration of energization to the current time) is stored as TRUE. In Step S13, the CPU 54 discriminates whether the process for temporarily determining the duration of energization corrected so as to increase speed is to be omitted or not. In other words, if the speed level SPDLVL is sufficiently high, the time TRUE corresponding to the actually required speed level SPDLVL is determined as a next interruption timing (Steps S14, S18). At this time, the flag XFLG is kept zero and the time thus determined is considered as the finally determined time. If the speed level is sufficiently high, any correction is impossible, even if the target step number has changed in the duration. It is because, for example, if the speed level is temporarily corrected to the level 4 to obtain the duration of energization of 1/1000 s but actually the pulse duration is to be changed to 1/800 s, such a rapid operation as required for correction between 1/800 and 1/1000 is not obtainable and practically of little use. If sufficiently rapid calculation is possible, the process of branching from Steps S13 to S14 can be omitted.

If the CPU 54 discriminates as no in Step S13, the duration of energization corresponding to the speed level YSPDLVL corrected so as to increase speed in Step S5 is set in a timer TY in Step S15. Then, the flag XFLG is set to 1 so as to discriminate that it is temporarily set. Thus, the means 18 for temporarily determining the duration of energization corrected so as to increase speed is composed of Steps S5, S15 and S16. As, in this embodiment, not the speed level SPDLVL corrected in Steps S7 to S10 but the speed level obtained by correcting the speed level prior to update so as to increase speed is used, the step number of the motor can properly follow up the target step number which may be varied to increase speed. This results in improved follow up when the power of the engine 40 is increased. Within the scope of the present invention, however, the speed level updated in Steps S7 to S10 may be corrected so as to increase speed. Further, the correction in Step S5 is not limited to one level, but the motor may be accelerated by more than two speed levels to see any change of the target step number. These aspects depend upon the characteristics of the system to be controlled. In FIG. 4, the updated speed level corresponds to the one corrected by two levels so as to increase speed.

If the CPU 54 discriminates as no or finally determined timing in Step S11, Step 17 is executed, and the target step number TARGET at this time is stored as TARGET0. In this case, it is stored in a RAM 56. Thus, the means 12 for storing the target step number is composed of Step S17 and the RAM 56.

If the CPU 54 discriminates as no in Step S13 in FIG. 7, that is, if the speed level is relatively low, the process in FIG. 7 is repeated at a timing faster than the previous speed level by one level in Steps S5, S15 and S16. In other words, if the process in FIG. 7 is executed at the timing T2 in FIG. 3, the process of FIG. 7 is repeated again at the timing T3A.

At this time, the timing is a temporarily determined one, and the CPU 54 discriminates as yes in Step S2. Then, the CPU 54 discriminates whether there is any change in the target step number or not in Step S20. In the embodiment as shown in FIG. 3, respective target step numbers at the timings T2 and T3A are compared with each other. Thus, the means 22 for discriminating whether there is any change in the target step number or not is composed of this Step S20.

If there is no change, the flag XFLG is set to zero in Step S21 so that the next execution timing is detected as the finally determined timing. Then, comparison is executed in Step S22. Specifically, in Step S22, TY determined in Step S15 is compared with TRUE determined in Step S12 at the previous execution timing. If they conform with each other, changeover to a pulse for advancing the motor to a next step number is required at the temporarily determined timing, and control is returned to the procedure in Step S2 and following steps. In this case, the temporarily determined time conforms with the finally determined time which has been re-derived, and the previously temporarily determined time is considered to be the finally determined one. If the CPU 54 discriminates as no in Step S22, TRUE is set in the interruption timer in Step S23 to repeat the execution at this time, so that the next process is executed at the finally determined timing to effect changeover of pulses to a pulse for the next step number. Thus, these processes constitute the means for determining the duration previously derived in Step S12 as a finally determined duration in the case there is no change in the target step number.

If any change in the target step number is found in Step S20, processes in Step S6 and following steps are executed. As Step S3 is not executed, for example at the timing T3A in FIG. 3, the deviation between the step number STEPN at the timing T2 (strictly speaking, the step number after the timing T2) and the target step number at the timing T3A is derived in Step S6 and used to derive a speed level in accordance therewith in Steps S7 to S10.

As the flag XFLG is i in this case, Step S25 and following steps are executed. At first, the flag XFLG is set to zero in Step S25 so as to treat the next execution timing as a finally determined timing. Then, the CPU 54 discriminates whether the speed level YSPDLVL corrected so as to increase speed in Step S5 conforms with the currently derived level SPDLVL or not, and if the CPU 54 discriminates as yes, the process for the finally determined timing is repeated. FIG. 3 illustrates such a case. If the CPU 54 discriminates as no, difference between the actual duration and the temporarily determined duration is derived in Step S27, and in Step 28, it is prepared that a next interruption is executed at a timing delayed by the time corresponding to the difference between the durations in Step S27. Thus, the means for treating the newly determined is duration of energization as a final determination is composed of Steps S6 to S10 and Steps S26, S27 and S28. In other words, the means 24 for finally determining the duration of energization is composed of Steps S21 and S23, and Steps S6 to S10, S26, S27 and S28.

As is shown in this embodiment, the step motor can properly follow up variation in the target step number by discriminating whether there is any change in the target step number when the duration of energization corrected so as to increase speed has elapsed, and, if the target step number has not changed, effecting changeover to energization for a next step after the noncorrected duration of energization, and, if the target step number has changed, effecting changeover to energization for a next step after a duration of energization derived from the step deviation after the change. This assures quite smooth operation of a system, such as an engine power control system.

Figure 8:
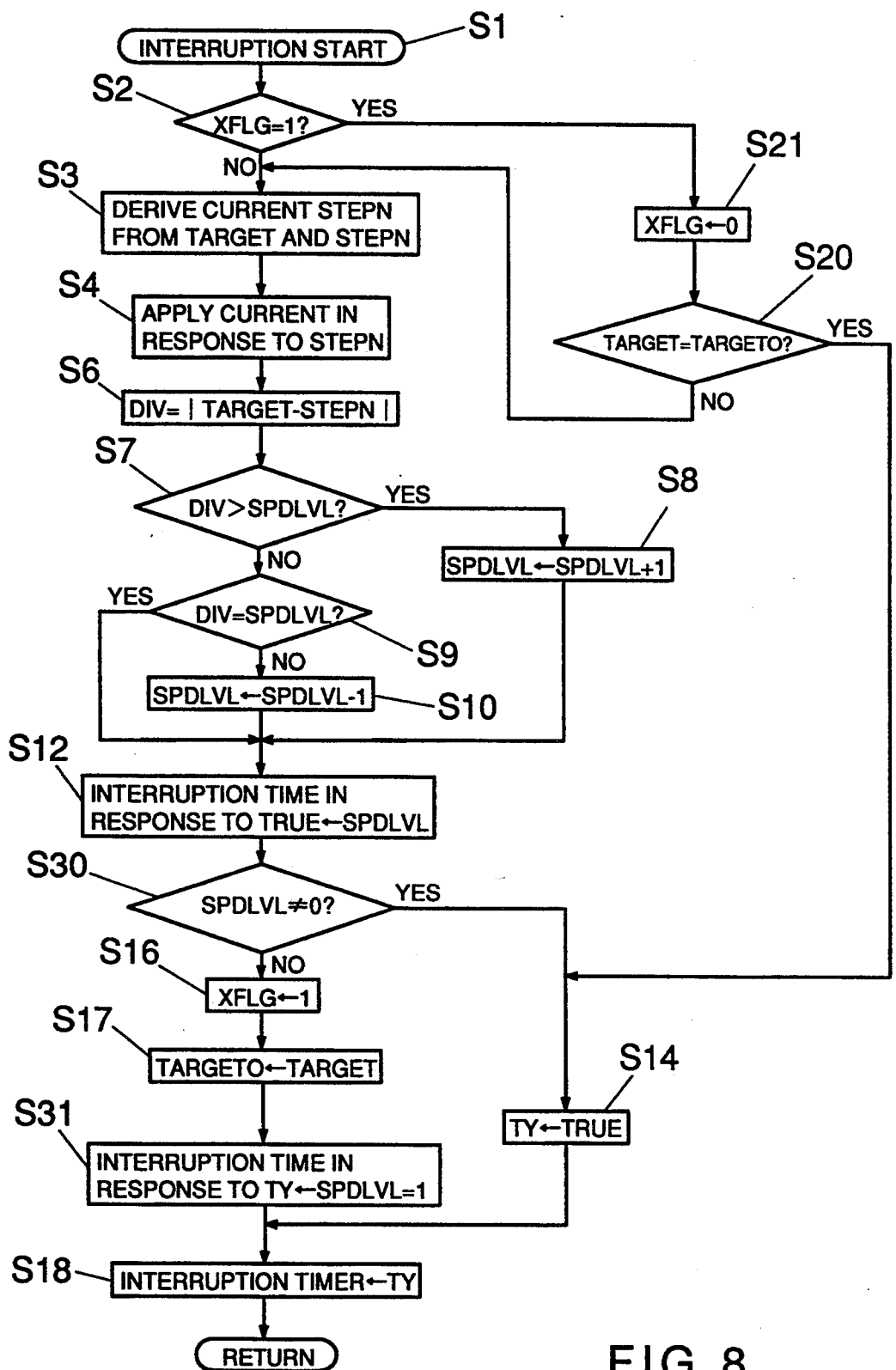
FIG. 8 is a flow chart of the procedure for the embodiment according to the second aspect of the invention.

Referring now to FIG. 8, a second embodiment will be described. This embodiment is provided in accordance with the second aspect of the invention shown in FIG. 2. The following description will mainly be related as to the difference with respect to the embodiment in FIG. 7. Starting from the timing when the finally determined duration of energization has elapsed, Step S5 is omitted, and in turn, Step S30 is added. Thus, the CPU 54 discriminates whether the speed level updated in accordance with the deviation DIV between the target step number at the time and the actual step number at the time is zero or not. If it is not zero, that is, the CPU 54 discriminates as yes in Step S30, Steps S14 and S18 are executed, and the process for the temporary determination is not executed. In other words, the process for temporary determination is not activated until the speed level becomes zero, providing the same operation as the prior art.

When the speed level becomes zero, the flag XFLG indicating temporary determination is set to 1 in Step S16, and the termination time of the duration of energization at the speed level 1 (i.e. at the lowest speed) is set in the interruption timer in Step S31.

At the temporarily determined time, Step S21 is executed and then in Step S20, the CPU 54 discriminates whether there is any change in the target step number. If the target step number has not changed, TRUE previously derived in Step S12 or the termination time of the duration of energization corresponding to the speed level zero is set in the interruption timer in Step S14 so as to achieve control for stopping the motor (in dotted lines in FIG. 3). If the target step number has changed, that is, if the CPU 54 discriminates as no in Step S20, Step S3 and the following steps are again executed. In other words, when the temporarily determined duration of energization has elapsed and the CPU 54 discriminates as no in Step S20, the same process is repeated. Then, when the temporarily determined duration has elapsed, the motor is advanced to a next step and a duration of energization for the next step is derived in accordance with a new target step number. As the motor is not stopped in this embodiment, it is not necessary to spend time for stopping the motor. Therefore, the step number of the motor can properly follow up the variation in the target step number, as shown in solid lines in FIG. 3.

In this embodiment, the means 34A for discriminating whether the duration of energization is for static or non-static operation is composed of Step S30. The means 34A may effect discrimination not from the duration of energization but from any value associated therewith, such as the speed level. Further, in this embodiment, the means 36A for final determination is composed of Step S14, and the means 38A for temporary determination is composed of Steps S16 and S31.

This embodiment requires less operational amount than the program in FIG. 7 and assures good follow up.

According to the present invention, a step motor can follow up the target step number which is varied with time, resulting in substantial improvement of follow up of a system controlled by the step motor.

Though the invention has been described with reference to preferred embodiments thereof, it is to be understood that modifications or variations may be easily made without departing from the scope of the present invention which is defined by the appended claims.

What is claimed is:

1. A controller for controlling a step motor to conform with a target step number which may be varied with time, the controller comprising:
   a timer for measuring time;
   timing detecting means utilizing the time measured by the timer for detecting a timing when a finally determined duration of energization has elapsed;
   means for permitting a drive circuit of the step motor to start energization for advancing the step motor to a next step number based on the timing detected by the timing detecting means;
   means for storing a target step number when the timing detecting means detects the timing;
   deriving means for deriving a step deviation between the stored target step number and an actual step number of the step motor;
   means for deriving a first duration of energization in accordance with the step deviation derived by the deriving means;
   means for determining a temporary duration of energization to increase speed in comparison with the first duration of energization derived by the deriving means;
   means utilizing the time measured by the timer for detecting a temporary timing when the temporary duration of energization has elapsed;
   means for discriminating whether there is a change in the target step number from the stored target step number and a current target step number; and means for determining a second duration of energization, wherein:
   the second duration of energization is the step deviation between the current target step number and the actual step number at an immediately preceding timing detected by the timing detecting means if the discriminating means determines that the target step number has changed, and
   the second duration of energization is the first duration of energization derived by the deriving means at an immediately preceding timing detected by the timing detecting means if the discriminating means determines that the target step number has not changed.

2. The controller for a step motor as defined in claim 1, wherein the second duration of energization determining means always determines the second duration of energization is the first duration of energization if the first duration of energization derived by the means is less than a predetermined duration.

3. The controller for a step motor as defined in claim 1, wherein the step motor is adapted to open and close a throttle valve.

4. The controller for a step motor as defined in claim 3, wherein the target step number is derived continuously in accordance with a depressed amount of the accelerator pedal.

5. The system for a step motor as defined in claim 3, wherein the target step number is derived continuously in accordance with a depressed amount of the accelerator pedal.

6. The controller for a step motor as defined in claim 1, wherein means for temporary determining the duration of energization determines the temporary duration of energization by correcting the first duration of energization in a preceding timing.

7. The system for a step motor as defined in claim 1, wherein the temporary duration of energization is determined by correcting the first duration of energization in a preceding timing.

8. A controller for controlling a step motor to conform with a target step number which may be varied with time, the controller comprising:
   a timer for measuring time;
   means utilizing the time measured by the timer for detecting a timing when a finally determined duration of energization has elapsed;
   means for permitting a drive circuit of the step motor to start energization for advancing the step motor to a next step number based on the timing detected by the timing detecting means;
   means for storing a target step number when the timing detecting means detects the timing;
   means for deriving a step deviation between the stored target step number and an actual step number of the step motor;
   means for deriving a first duration of energization in accordance with the step deviation derived by the deriving means;
   means for discriminating whether the first duration of energization corresponds to a static or non-static operation;
   means for determining a static duration of energization is equal to the first duration of energization if the first duration of energization corresponds to the non-static operation;
   means for determining a temporary duration of energization corresponding to an increased speed if the first duration of energization corresponds to the static operation;
   means utilizing the time measured by the timer for detecting a temporary timing when the temporary duration of energization has elapsed;
   means for discriminating whether there is a change in the target step number or not from the stored target step number and a current target step number; and
   means for determining a second duration of energization, wherein:
      the second duration of energization is equal to the temporary duration of energization if the change discriminating means determines that the target step number has changed, and
      the second duration of energization is equal to the first duration of energization derived by the deriving means at an immediately precedent timing detected by the timing detecting means if the change discriminating means determines that the target step number has not changed.

9. A system for controlling a step motor to conform with a target step number which may be varied with time, the system comprising:
   a timer for measuring time;
   a controller comprising:
      means for utilizing the time measured by the timer for detecting a timing when a finally determined duration of energization has elapsed;
      means for permitting a drive circuit of the step motor to start energization for advancing the step motor to a next step number based on the timing;
      means for storing the target step number when the timing is detected;
      means for deriving a step deviation between the stored target step number and an actual step number of the step motor;
      means for deriving a first duration of energization in accordance with the step deviation;
      means for determining a temporary duration of energization to increase speed in comparison with the first duration of energization;
      means for utilizing the time measured by the timer for detecting a temporary timing when the temporary duration of energization has elapsed;
      means for discriminating whether there is a change in the target step number or not from the stored target step number and a current target step number; and
      means for determining a second duration of energization, wherein:
         the second duration of energization is the step deviation between the current target step number and the actual step number at an immediately precedent timing if the target step number has changed, and
         the second duration of energization is the first duration of energization at an immediately precedent timing if the target step number has not changed.

10. The system for a step motor as defined in claim 9, wherein the second duration of energization is always the first duration of energization, if the first duration of energization is less than a predetermined duration.

11. The system for a step motor as defined in claim 9, wherein the step motor opens and closes a throttle valve.

12. A system for controlling a step motor to conform with a target step number which may be varied with time, the system comprising:
- a timer for measuring time;
- a controller comprising:
    - means for utilizing the time measured by the timer for detecting a timing when a finally determined duration of energization has elapsed;
    - means for permitting a drive circuit of the step motor to start energization for advancing the step motor to a next step number based on the timing;
    - means for storing the target step number when the timing is detected;
    - means for deriving a step deviation between the stored target step number and an actual step number of the step motor;
    - means for deriving a first duration of energization in accordance with the step deviation;
    - means for determining whether the first duration of energization corresponds to a static or non-static operation;
    - means for determining a static duration of energization is equal to the first duration of energization if the first duration of energization corresponds to the non-static operation;
    - means for determining a temporary duration of energization corresponding to an increased speed if the first duration of energization corresponds to the static operation;
    - means for utilizing the time measured by the timer for detecting a temporary timing when the temporary duration of energization has elapsed;
    - means for discriminating whether there is a change in the target step number or not from the stored target step number and a current target step number; and determine a second determined duration of energization, wherein:
        - the second duration of energization is equal to the temporary duration of energization if the target step number has changed, and
        - the second duration of energization is equal to the first duration of energization at an immediately precedent timing if the target step number has not changed.

* * * * *

UNITED STATES PATENT AND TRADEMARK OFFICE
CERTIFICATE OF CORRECTION

PATENT NO. : 5,389,866
DATED : February 14, 1995
INVENTOR(S) : Katsumi ISHIDA, Hiroshi MIYATA and Naoto KUSHI It is certified that error appears in the above-indentified patent and that said Letters Patent is hereby corrected as shown below:

ON THE COVER PAGE:

[73] Assignees: Change "Toyoto" to --Toyota--.

Signed and Sealed this

Twenty-seventh Day of June, 1995

Attest:

BRUCE LEHMAN

Attesting Officer     Commissioner of Patents and Trademarks